UNITED STATES PATENT OFFICE 2,612,479

RECLAIMING MIXTURES OF VULCANIZED NATURAL RUBBER AND SYNTHETIC RUBBER SCRAPS

Walter G. Kirby, Naugatuck, and Leo E. Steinle, Beacon Falls, Conn., assignors to United States Rubber Company, New York, N. Y., a corporation of New Jersey No Drawing. Application August 23, 1950, Serial No. 181,104

8 Claims. (Cl. 260—2.3)

This invention relates to a process for reclaiming mixtures of vulcanized natural rubber and vulcanized butadiene-styrene copolymer synthetic rubber scraps.

Vulcanized butadiene-styrene copolymer synthetic rubber scrap is much more difficult to reclaim or soften to a millable condition than vulcanized natural rubber scrap. As a result, when a mixture of vulcanized butadiene-styrene copolymer synthetic rubber and vulcanized natural rubber scraps is subjected to heat and plasticizing agents to such an extent that the natural rubber portion becomes sufficiently soft and millable for a satisfactory reclaim, the synthetic rubber portion remains comparatively hard. When attempts are made to mill or refine such a reclaim mixture to a smooth sheet, the harder reclaimed synthetic rubber particles produce a roughness in the blend which results in a non-uniform and inferior grade of reclaim. Prior to the use of synthetic rubbers practically all vulcanized scraps were natural rubber. A great majority of such natural rubber scrap was reclaimed by the alkali digester process. The alkali type natural rubber reclaim had a higher value than other types of reclaims because it had a faster rate of cure and a general similarity to crude rubber in properties such as tackiness, elasticity, tensile and milling. When vulcanized synthetic rubber scrap became available, the alkali process proved unsuitable for its reclaiming and as a result gradually went out of use. The reclaiming process now generally used for vulcanized synthetic scraps and for mixtures of the same with natural rubber scraps, is carried out in an acid or neutral medium. Reclaims produced by these methods lack many of the valuable properties of alkali type natural rubber reclaim in that they are slower in rate of cure and have less tackiness, elasticity and tensile.

An object of the present invention is to provide an improvement in the process of reclaiming mixtures of vulcanized natural rubber and vulcanized butadiene-styrene copolymer synthetic rubber scraps.

Another object of the present invention is to provide a method of reclaiming mixtures of vulcanized natural rubber and vulcanized butadiene-styrene copolymer synthetic rubber scraps in contact with each other and in the same mass to produce a reclaim product that in quality and general properties resembles an all natural rubber alkali type reclaim.

A further object of the present invention is to provide an improved method of plasticizing mixtures of vulcanized natural rubber and vulcanized butadiene-styrene copolymer synthetic rubber scraps so that each type will be plasticized or softened to a sufficiently uniform degree of viscosity and the reclaimed mixture will better mill or refine to produce a satisfactory uniform homogeneous finished reclaim product.

In carrying out the present invention, a mixture of vulcanized natural rubber scrap and vulcanized butadiene-styrene copolymer synthetic rubber scrap is first subjected to heat and conventional plasticizing agents in a non-alkaline medium until the synthetic rubber portion is sufficiently soft and millable for a satisfactory reclaim and the natural rubber portion is in too soft a condition for a satisfactory reclaim and any fibers present have been disintegrated. There is then added to the mixed reclaim an agent which at elevated reclaiming temperatures will harden the natural rubber portion at a faster rate than the synthetic rubber portion, so that in a relatively short period of time the extremely soft natural rubber portion will be hardened sufficiently to make a satisfactory reclaim and the synthetic rubber portion will be hardened to a lesser extent and will remain sufficiently soft for a satisfactory reclaim. We have found that sodium hydroxide and certain other alkaline materials are such rubber stiffening agents as will impart a differential increase in hardness to natural rubber and butadiene-styrene copolymer synthetic rubber, making the process of the present invention possible. Alkaline stiffening agents other than sodium hydroxide that may be used in the present invention are potassium hydroxide, calcium hydroxide, ammonium hydroxide, sodium carbonate, potassium carbonate, trisodium phosphate, tripotassium phosphate, sodium sulphite, potassium sulphite. Mixtures of such alkaline materials may be used. The amount of such hardening or stiffening agent used is not critical. Generally, the amount of stiffening agent added will be between 2 and 10 percent by weight of the original mixed scraps. The treatment at elevated temperature of the mixed softened scraps with the sodium hydroxide or other alkaline stiffening agent is only for the short time necessary to harden the rubbers, after which the alkaline material may or may not be washed out as in the usual manner with alkali reclaims, giving a product which will mill and smooth out readily into a relatively uniform, high quality, satisfactory sheet. The time of treatment of the mixed softened scraps with the sodium hydroxide or other stiffening agent will be a fraction, generally less than one-half the time for softening the scraps and destroying the fibres. The butadiene-styrene copolymer synthetic rubber in the scrap to be reclaimed is generally from GR-S synthetic rubber which contains a major proportion of butadiene-1,3 and a minor proportion of styrene. The weight ratio of such synthetic rubber to natural rubber in the scrap may be in the range from 1:9 to 9:1.

The reclaiming process of the present invention may be carried out in conventional reclaiming apparatus, for example, as used in the "digester" or "mechanical" reclaiming processes. In conventional reclaiming processes, ground vulcanized rubber scrap is subjected to heat and in the case of the mechanical process to heat and mechanical working. It is customary to use plasticizing agents such as softening oils and, if desired, chemical plasticizers and fiber destroying agents to accelerate the disintegration of cellulose contained in the scrap. The rubber is thus softened down to a workable condition and the fiber present is destroyed. The effectiveness of a reclaiming operation in recovering scrap vulcanized rubber may be quantitatively shown by means of an instrument widely used for this purpose in the reclaim rubber industry, namely, the Mooney shearing disc plastometer. This device has been described by M. Mooney in Industrial and Engineering Chemistry, An. Ed., 6, 147 (1934). By means of this device the viscosity of a plastic material in shear may be readily and quantitatively measured. Experience has shown that reclaims with a Mooney viscosity of 50 to 180 measured at 180° F. can be processed on standard rubber working machinery. Reclaims with a Mooney viscosity of 80 to 120 measured at 180° F. are preferred since these are the most practical to process. Reclaims with a higher Mooney viscosity than 180 measured at 180° F. are too hard, and reclaims with a lower Mooney viscosity than 50 measured at 180° F. are too soft for efficient processing. Thus when mixtures of natural rubber scraps and synthetic rubber scraps are reclaimed by conventional processes, if the reclaiming is carried to the extent to give a satisfactory Mooney viscosity to the natural rubber portion, the synthetic rubber portion will be too hard, and if the reclaiming is carried to the extent to give a satisfactory Mooney to the synthetic rubber portion, the natural rubber portion will be too soft. The finished milled reclaims in the former case will be too rough because of the harder reclaimed synthetic rubber particles, and in the latter case they will be too soft and "soupy" from the excessively soft natural rubber portion. The present invention narrows the range between the higher viscosity of the synthetic rubber reclaim and the lower viscosity of the natural rubber reclaim to give a uniform reclaim from mixed natural and synthetic rubber scraps with a satisfactory viscosity and improved milling properties.

In the conventional "digester" process, the ground vulcanized fiber-containing rubber scrap and plasticizing agents, such as softening oils and chemical plasticizers, and a cellulose-destroying chemical, such as caustic soda or zinc chloride, together with a large amount of water, generally one to three times the weight of the scrap, is heated under pressure in a closed steam jacketed container or "digester" equipped with an agitator until the cellulose fiber in the scrap is destroyed and the rubber becomes plasticized. The charge may then be washed free from added chemicals, such as sodium hydroxide or zinc chloride, and dried and milled. The temperature in the digester is from 300° F. to 430° F., and the time of treatment is several hours. In the process of the present invention, the initial treatment in the "digester" is in a neutral or acid (non-alkaline) solution, at the usual "digester" reclaiming temperatures from 300° F. to 430° F. for several hours to destroy the fiber and to excessively soften the natural rubber portion to an unsatisfactory soft condition, i. e., to a Mooney viscosity measured at 180° F. between about 20 and about 40. At the same time, the synthetic rubber portion which softens with more difficulty will be softened to a satisfactory Mooney viscosity measured at 180° F. between about 50 and about 140. The alkaline stiffening agent, such as sodium hydroxide, is then added to the digester charge with agitation continued for 10 minutes to an hour, which will harden both the natural rubber portion and the synthetic rubber portion, but the former much more than the latter, so that the Mooney viscosities measured at 180° F. of the blend of the natural rubber scrap particles and the synthetic rubber scrap particles will be in the normal range of 50 to 180 for satisfactory reclaim. This short after-treatment with sodium hydroxide is entirely different from the extended digestion of scrap in the presence of sodium hydroxide in the "alkali reclaim" process, or the extended digestion of fiber-containing reclaim in aqueous sodium hydroxide to destroy fibers not destroyed in a prior reclaiming operation. In these cases, the extended digestion in the caustic alkali solution containing the conventional plasticizers overcomes any inherent stiffening action of the sodium hydroxide.

In the conventional "mechanical" process, the dry vulcanized fiber-containing or fiber-free rubber scraps and plasticizing agents are subject to increasing temperature in an internal mixer having a jacket through which hot water flows, such as a Banbury mixer, under mechanical pressure exerted by a ram upon the scrap which is worked upon by rotors into the mixer chamber. The temperature may rise to 300° F. to 550° F. The time of treatment may range from 5 to 60 minutes, after which the charge may be cooled by flowing cooling water through the jacketed walls and rotors of the mixer and by adding water to the charge. In the process of the present invention, the mixed vulcanized natural rubber and synthetic rubber scraps admixed with conventional plasticizing agents and in a non-alkaline condition are heated in the Banbury at the usual temperatures between 300° F. and 550° F. with working until the fiber present is disintegrated and the natural rubber portion is softened to a Mooney viscosity measured at 180° F. between about 20 and about 40. This may take 5 to 60 minutes. At the same time, the synthetic rubber portion which softens with more difficulty will have a satisfactory Mooney viscosity measured at 180° F. between about 50 and about 140. Sodium hydroxide or other alkaline stiffening agent is then incorporated in the softened charge in the Banbury as by adding it in solution in the water and mixing it in for a few minutes. The mixing time may be from 2 to 10 minutes, and is less than the plasticizing time before the alkali addition. The reclaim can then be sheeted to a satisfactory uniform sheet.

In practice it is not necessary to follow each run by a determination of the Mooney viscosities of the natural and synthetic portions of the reclaim. It generally suffices to determine the Mooney viscosity of the final product before milling and refining. Reclaiming rubber is practically a continuous operation and an experienced operator knowing the Mooney viscosity of the mixed reclaim prepared according to the present invention in a particular run can compensate subsequent runs so that the finished stock has a Mooney viscosity which is within the range of 50 to 180 measured at 180° F., and generally within the preferred range of 80 to 120 measured at 180° F.

The following examples illustrate the invention, all parts and percentages referred to herein being by weight:

*Example I*

Ten thousand pounds of ground scrap containing about 25% of fibers and the rubber portion comprising about 80% of vulcanized natural rubber and about 20% of vulcanized GR-S synthetic rubber were placed in a "digester" with 1000 pounds of pine oil fraction and 800 pounds of rosin oil (softening oils), 100 pounds of technical discresyl sulfide (chemical plasticizer), 100 pounds of calcium chloride (cellulose defiberizing agent), and 20,000 pounds of water. The "digester" was sealed and heated under pressure at about 388° F. for about 5 hours. The cellulose fiber was destroyed, and the Mooney viscosities measured at 180° F. of the natural rubber portion was about 20, and of the synthetic rubber portion was about 70. An alkaline stiffening agent, viz. 610 pounds of sodium hydroxide was then introduced into the "digester" charge and the heating and mixing continued for 30 minutes at 388° F. After this hardening treatment the Mooney viscosity measured at 180° F. of the natural rubber portion was about 70 and that of the synthetic rubber portion was about 100, giving a satisfactory Mooney viscosity range of 50 to 180 for the natural rubber and synthetic rubber portions, and for the blend. The reclaim from the "digester" was washed, dried and milled on tight mill rolls to give a satisfactory smooth reclaim. The Mooney viscosity measurements above were made on actual separated natural rubber and synthetic rubber scrap particles.

*Example II*

One hundred thirty-one pounds of ground scrap containing about 25% of fibers and the rubber portion comprising about 80% of vulcanized natural rubber and about 20% of vulcanized GR-S synthetic rubber scrap, 9 pounds of coal oil fraction, 9 pounds of rosin oil, 6 pounds of carbon black, and 3.5 pounds of rosin oil, were loaded into a Banbury mixer used for "mechanical" reclaiming of rubber which was heated by pressure and friction from mechanical action. The charge was masticated in the Banbury under about 200 pounds per sq. in. ram pressure for 16 minutes, the temperature of the charge reaching about 500° F., whereupon the fiber was destroyed and the Mooney viscosities measured at 180° F. of the natural rubber portion was about 20, and of the synthetic rubber portion was about 80. Three and one-half pounds of 50% aqueous sodium hydoxide solution at 80° F. was introduced into the Banbury charge along with about one gallon of cooling water and the mixing continued for 3 minutes, after which the batch was discharged as a satisfactory mixed reclaim.

The plasticizing agents used in the present invention are those conventionally used in reclaiming operations and the amount is not critical. Generally, 1 to 25 per cent of the weight of the scrap to be reclaimed may be conventional softening oils. If a conventional chemical plasticizer is also used, it will generally be in amount up to 10 per cent of the weight of the scrap. Examples of known chemical plasticizers that may be added to aid in softening the scrap are thiophenols, hydrazines, alkyl amines, aliphatic polyamines, mercaptans, di(hydroxyaryl) sulfides, thiophenes, organic acids, etc. Where a fiber disintegrating agent, such as zinc chloride or calcium chloride is added to aid in the destruction of the fiber, the amount used may be up to 3% of the weight of the conventional fiber-containing scraps. In any case, according to the present invention, the fiber present in the scrap is disintegrated in the initial rubber softening treatment in a neutral or acid medium, and the alkaline stiffening agent, such as sodium hydroxide, is added to the reclaim after the fibers have been disintegrated for the purpose of differentially hardening or stiffening the softened natural rubber and synthetic rubber portions.

In view of the many changes and modifications that may be made without departing from the principles underlying the invention, reference should be made to the appended claims for an understanding of the scope of the protection afforded the invention.

Having thus described our invention what we claim and desire to protect by Letters Patent is:

1. A process for reclaiming mixtures of vulcanized natural rubber and vulcanized butadiene-styrene copolymer synthetic rubber scraps which comprises heating the scraps in a non-alkaline medium for a time sufficient to soften the natural rubber portion to an excessively soft condition where the Mooney viscosity measured at 180° F. is between about 20 and about 40, and to soften the synthetic rubber portion to a satisfactory soft condition where the Mooney viscosity measured at 180° F. is between about 50 and about 140, and heating said softened mixture with materials selected from the group consisting of sodium hydroxide, potassium hydroxide, calcium hydroxide, ammonium hydroxide, sodium carbonate, potassium carbonate, trisodium phosphate, tripotassium phosphate, sodium sulphite, and potassium sulphite, whereupon the natural rubber portion will increase in viscosity at a faster rate than the synthetic rubber portion to give a more uniform reclaim having a Mooney viscosity measured at 180° F. in the range between 50 and 180.

2. A process for reclaiming mixtures of vulcanized natural rubber and vulcanized butadiene-styrene synthetic rubber scraps which comprises heating the scraps in a non-alkaline medium for a time sufficient to soften the natural rubber portion to an excessively soft condition where the Mooney viscosity measured at 180° F. is between about 20 and about 40, and to soften the synthetic rubber portion to a satisfactory soft condition where the Mooney viscosity measured at 180° F. is between about 50 and about 140, and heating said softened mixture with sodium hydroxide whereupon the natural rubber portion will increase in viscosity at a faster rate than the synthetic rubber portion to give a more uniform reclaim having a Mooney viscosity measured at 180° F. in the range between 50 and 180.

3. A process for reclaiming mixtures of fiber-containing vulcanized natural rubber and vulcanized butadiene-styrene copolymer synthetic rubber scraps which comprises heating the scraps in a non-alkaline medium for a time sufficient to destroy the fibers in the scrap, and to soften the natural rubber portion to an excessively soft condition where the Mooney viscosity measured at 180° F. is between about 20 and about 40, and to soften the synthetic rubber portion to a satisfactory soft condition where the Mooney viscosity measured at 180° F. is between about 50 and about 140, and heating said softened mixture with materials selected from the group consisting of sodium hydroxide, potassium hydroxide, calcium hydroxide, ammonium hydroxide, sodium carbonate, potassium carbonate, trisodium phosphate, tripotassium phosphate, sodium sulphite, and potassium sulphite, whereupon the natural rubber portion will increase in viscosity at a faster rate than the synthetic rubber portion to give a more uniform reclaim having a Mooney viscosity measured at 180° F. in the range between 50 and 180.

4. A process for reclaiming mixtures of fiber-containing vulcanized natural rubber and vulcanized butadiene-styrene copolymer synthetic rubber scraps which comprises heating the scraps in a non-alkaline medium for a time sufficient to destroy the fibers in the scrap, and to soften the natural rubber portion to an excessively soft condition where the Mooney viscosity measured at 180° F. is between about 20 and about 40, and to soften the synthetic rubber portion to a satisfactory soft condition where the Mooney viscosity measured at 180° F. is between about 50 and about 140, and heating said softened mixture with sodium hydroxide whereupon the natural rubber portion will increase in viscosity at a faster rate than the synthetic rubber portion to give a more uniform reclaim having a Mooney viscosity measured at 180° F. in the range between 50 and 180.

5. A process for reclaiming mixtures of fiber-containing vulcanized natural rubber and vulcanized butadiene-styrene copolymer synthetic rubber scraps which comprises heating the scraps in a neutral medium for a time sufficient to destroy the fibers in the scrap, and to soften the natural rubber portion to an excessively soft condition where the Mooney viscosity measured at 180° F. is between about 20 and about 40, and to soften the synthetic rubber portion to a satisfactory soft condition where the Mooney viscosity measured at 180° F. is between about 50 and about 140, and heating said softened mixture with materials selected from the group consisting of sodium hydroxide, potassium hydroxide, calcium hydroxide, ammonium hydroxide, sodium carbonate, potassium carbonate, trisodium phosphate, tripotassium phosphate, sodium sulphite, and potassium sulphite, whereupon the natural rubber portion will increase in viscosity at a faster rate than the synthetic rubber portion to give a more uniform reclaim having a Mooney viscosity measured at 180° F. in the range between 50 and 180.

6. A process for reclaiming mixtures of fiber-containing vulcanized natural rubber and vulcanized butadiene-styrene copolymer synthetic rubber scraps which comprises heating the scraps in a neutral medium for a time sufficient to destroy the fibers in the scrap, and to soften the natural rubber portion to an excessively soft condition where the Mooney viscosity measured at 180° F. is between about 20 and about 40, and to soften the synthetic rubber portion to a satisfactory soft condition where the Mooney viscosity measured at 180° F. is between about 50 and about 140, and heating said softened mixture with sodium hydroxide whereupon the natural rubber portion will increase in viscosity at a faster rate than the synthetic rubber portion to give a more uniform reclaim having a Mooney viscosity measured at 180° F. in the range between 50 and 180.

7. A process for reclaiming mixtures of fiber-containing vulcanized natural rubber and vulcanized butadiene-styrene copolymer synthetic rubber scraps which comprises heating the scraps in an acid medium for a time sufficient to destroy the fibers in the scrap, and to soften the natural rubber portion to an excessively soft condition where the Mooney viscosity measured at 180° F. is between about 20 and about 40, and to soften the synthetic rubber portion to a satisfactory soft condition where the Mooney viscosity measured at 180° F. is between about 50 and about 140, and heating said softened mixture with materials selected from the group consisting of sodium hydroxide, potassium hydroxide, calcium hydroxide, ammonium hydroxide, sodium carbonate, potassium carbonate, trisodium phosphate, tripotassium phosphate, sodium sulphite, and potassium sulphite, whereupon the natural rubber portion will increase in viscosity at a faster rate than the synthetic rubber portion to give a more uniform reclaim having a Mooney viscosity measured at 180° F. in the range between 50 and 180.

8. A process for reclaiming mixtures of fiber-containing vulcanized natural rubber and vulcanized butadiene-styrene copolymer synthetic rubber scraps which comprises heating the scraps in an acid medium for a time sufficient to destroy the fibers in the scrap, and to soften the natural rubber portion to an excessively soft condition where the Mooney viscosity measured at 180° F. is between about 20 and about 40, and to soften the synthetic rubber portion to a satisfactory soft condition where the Mooney viscosity measured at 180° F. is between about 50 and about 140, and heating said softened mixture with sodium hydroxide whereupon the natural rubber portion will increase in viscosity at a faster rate than the synthetic rubber portion to give a more uniform reclaim having a Mooney viscosity measured at 180° F. in the range between 50 and 180.

WALTER G. KIRBY.
LEO E. STEINLE.

REFERENCES CITED

The following references are of record in the file of this patent:

UNITED STATES PATENTS

| Number | Name | Date |
| --- | --- | --- |
| 2,471,496 | Randall | May 31, 1949 |
| 2,522,069 | Staten et al. | Sept. 12, 1950 |
| 2,567,802 | Carr | Sept. 11, 1951 |

FOREIGN PATENTS

| Number | Country | Date |
| --- | --- | --- |
| 558,334 | Great Britain | Dec. 31, 1943 |